Oct. 26, 1971   E. C. WUEST ET AL   3,615,030
SELF-LOADING BOAT CARRIER
Filed Sept. 18, 1969   4 Sheets-Sheet 1
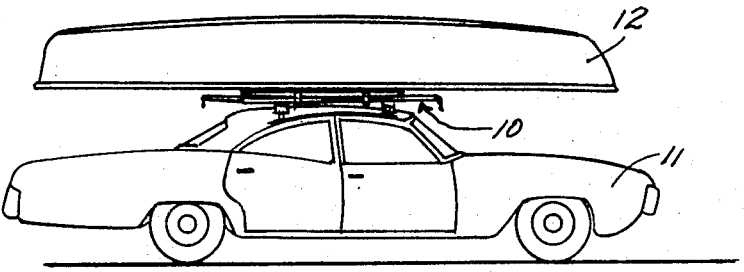
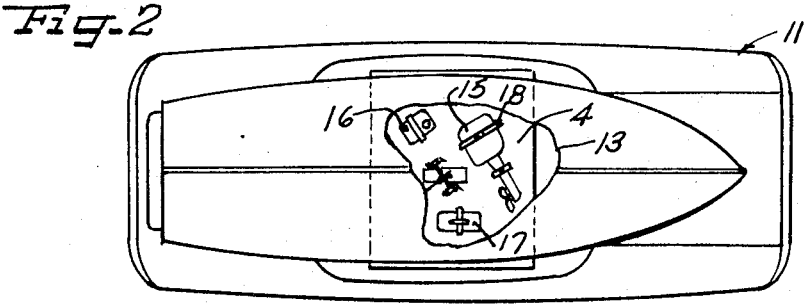
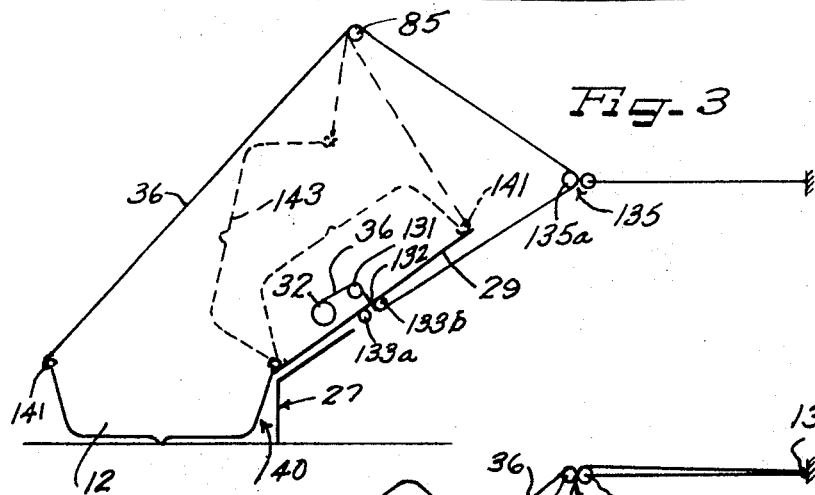
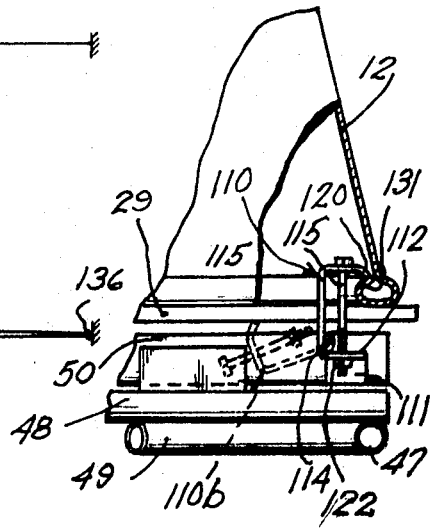
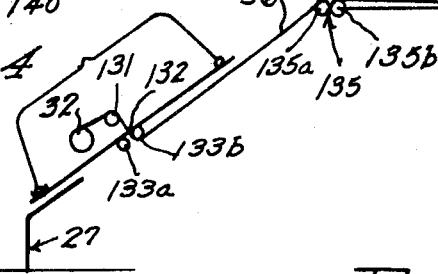
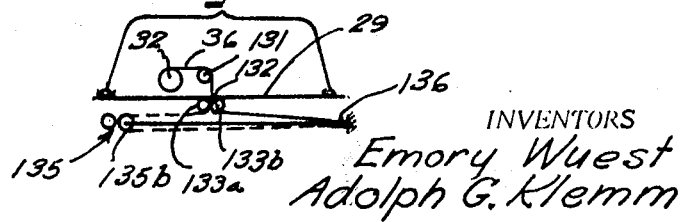
INVENTORS
Emory Wuest
Adolph G. Klemm
BY   Hill, Sherman, Meroni, Gross & Simpson   ATTORNEYS

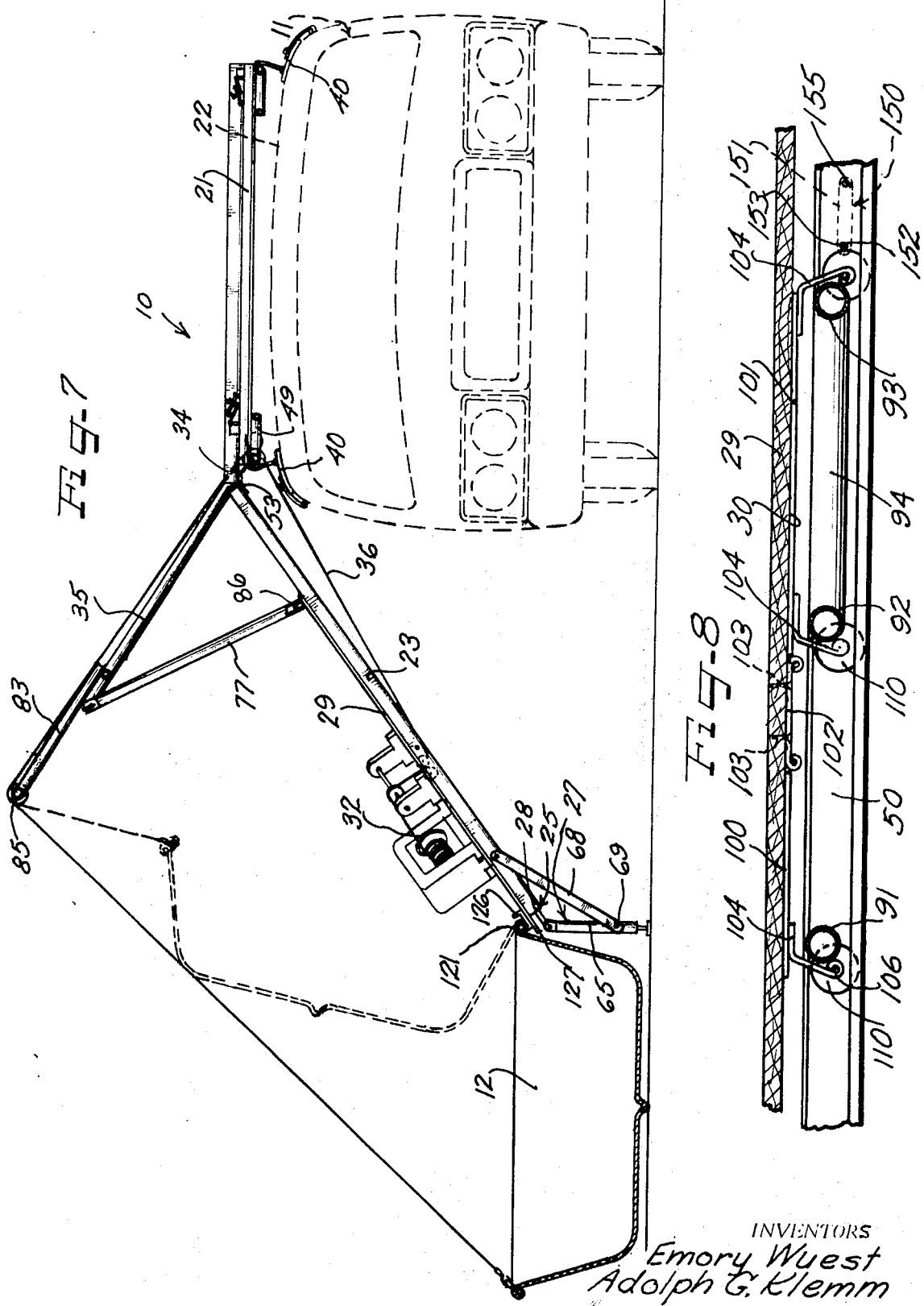

Oct. 26, 1971   E. C. WUEST ET AL   3,615,030
SELF-LOADING BOAT CARRIER
Filed Sept. 18, 1969   4 Sheets-Sheet 3
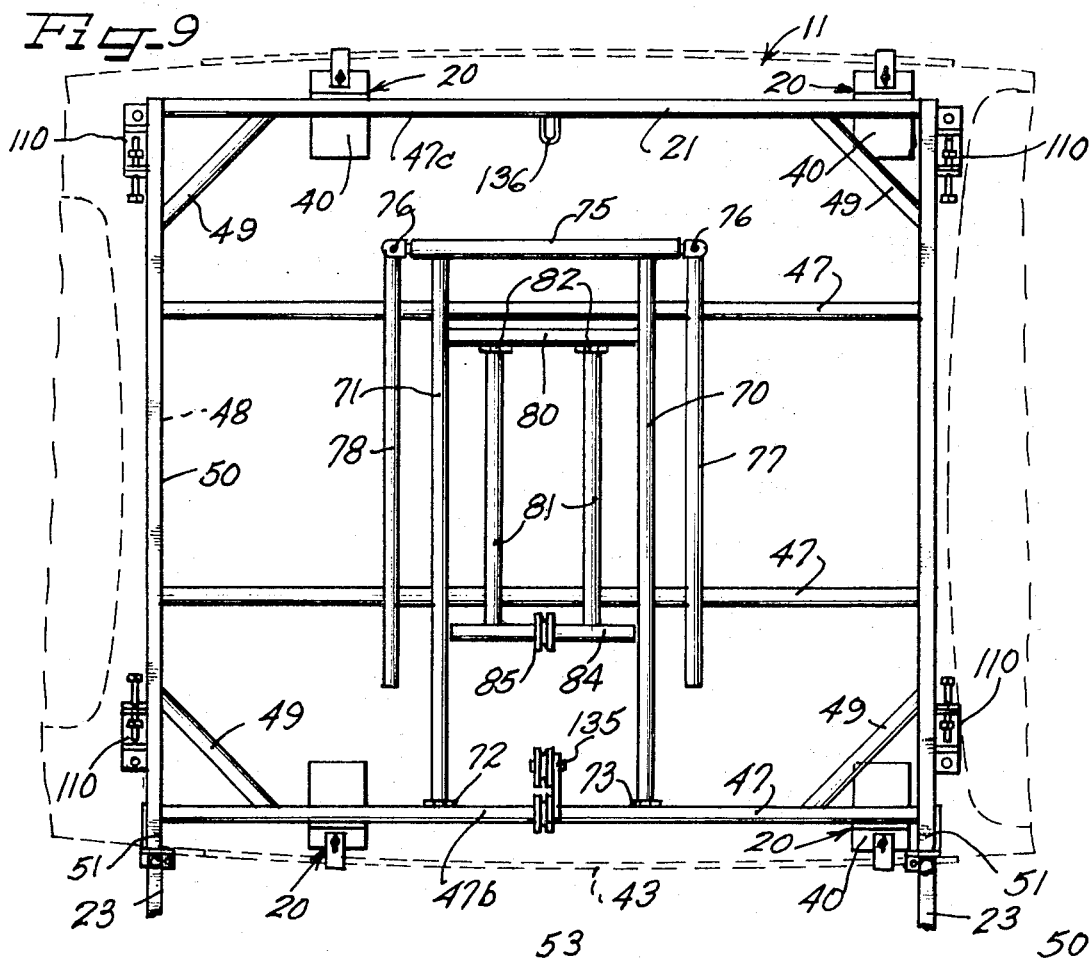
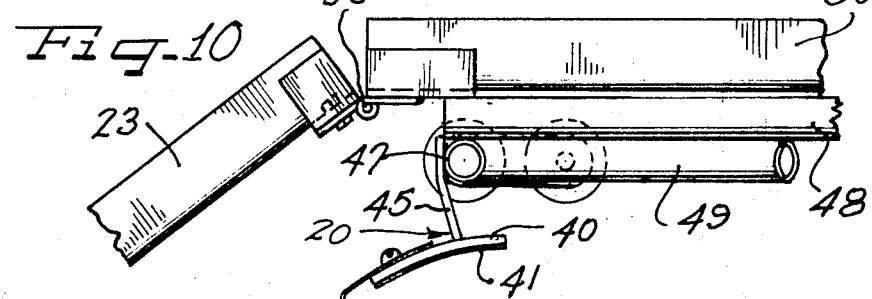
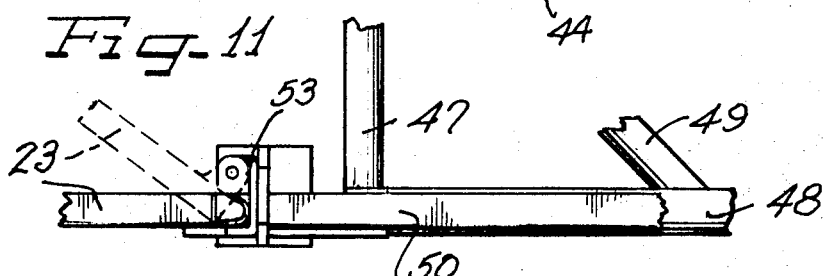
INVENTORS
Emory Wuest
Adolph G. Klemm
BY   ATTORNEYS Oct. 26, 1971  E. C. WUEST ET AL  3,615,030
SELF-LOADING BOAT CARRIER
Filed Sept. 18, 1969  4 Sheets-Sheet 4
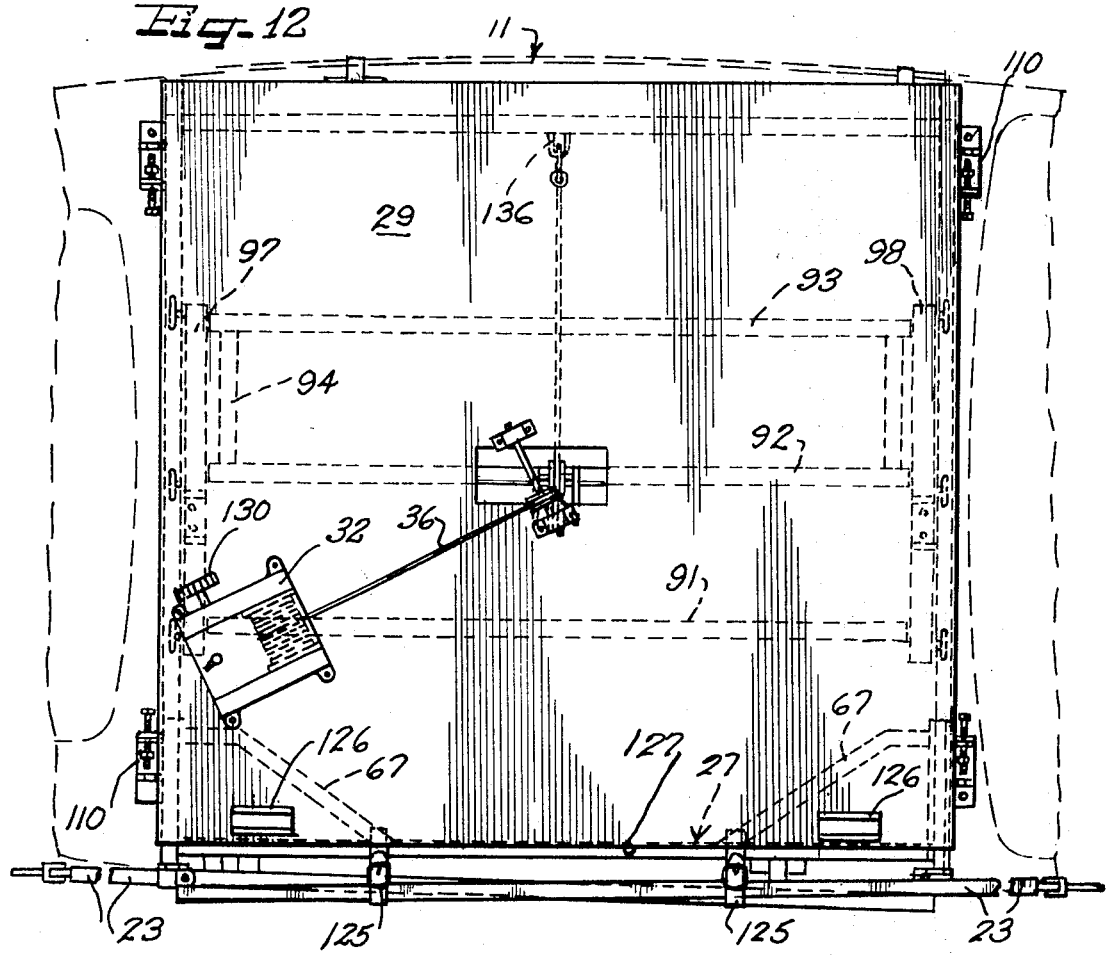
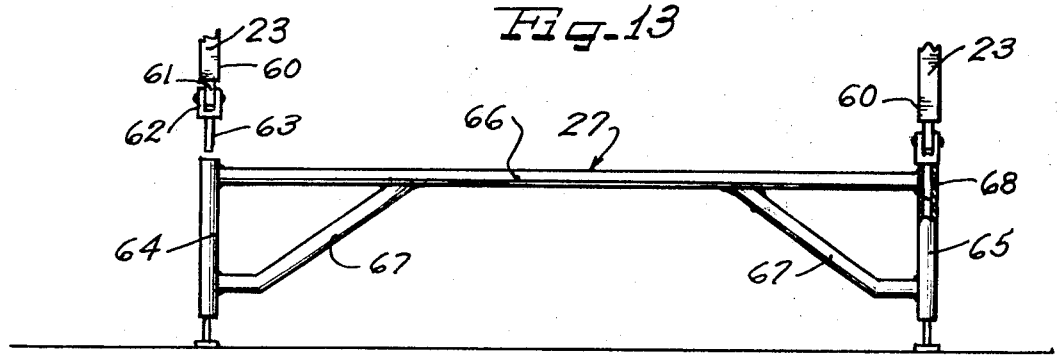
INVENTORS
Emory Wuest
Adolph G. Klemm
BY Hill, Sherman, Meroni, Gross & Simpson ATTORNEYS

United States Patent Office 3,615,030
Patented Oct. 26, 1971

3,615,030
SELF-LOADING BOAT CARRIER
Emory Wuest, 4135 N. Monitor Ave., Chicago, Ill. 60634, and Adolph G. Klemm, 10956 Wellington, Melrose Park, Ill. 60164
Filed Sept. 18, 1969, Ser. No. 859,124
Int. Cl. B60n 9/00
U.S. Cl. 214—450
6 Claims

ABSTRACT OF THE DISCLOSURE

A device mountable atop an automobile which includes a frame attachable to the roof of the automobile, the frame carries a bed, atop of which a boat may be mounted. The bed has roller wheels associated therewith and the frame has foldable leg means attached thereto which are adapted to extend from the portion of the frame atop the automobile outwardly and downwardly to a position adjacent the side of the automobile. The bed is adapted to roll off the frame onto the legs. The bed carries a winch and the frame has a jim boom associated therewith cooperating with the winch cable to lift a boat from alongside of the ends of the legs to a position atop the bed, the winch cable thereafter being capable of attachment to a portion of the frame to lift the bed with the boat mounted thereatop along the legs to a position atop the frame.

BACKGROUND OF THE INVENTION

Field of the invention

This invention relates to automotive accessories and more particularly to a roof attachment for carrying boats.

Prior art

Roof attachments for vehicles for the purpose of carrying luggage, equipment, or boats are known to the art. Many specialist carriers designed primarily for carrying boats have been developed (see for example the patent to Hacker et al., No. 2,506,421). Such carriers require that the boat be lifted atop the car and thereafter fastened to the carrier.

Some prior art carriers (such as those illustrated in U.S. Pat. No. 2,849,135, to Embler and No. 3,186,569 to Roux) have provided rail members attachable at one end to the carrier atop the car and at the other end either to the ground or to foot members positioned on the ground.

Some of the prior art boat carriers have further been equipped with winches, usually hand-operated, for drawing the boat atop the automobile, and it has been suggested to provide movable frame members which cooperate with stationary frame members to provide a mounting base for the boat.

In most instances, the boat is stored bottom-up on the carrier frame which requires that the boat be lifted from either the ground or the water, inverted, and placed atop the frame or movable member thereof. Modern-day small boats, although usually made of light metal, are, due to their size, relatively heavy and quite awkward for one or in many cases two persons to lift and invert so that they may be placed atop the carrier.

SUMMARY OF THE INVENTION

The present invention provides a convenient semi-automatic self-loading boat carrier. The boat carrier consists of a plurality of attachment mounts for attaching the carrier to the roof gutters of an automobile. The attachment mounts support a base frame atop the roof of a vehicle. The base frame has associated therewith foldable rail legs extendable from the base frame to a point alongside the vehicle spaced slightly above the ground a distance approximately equal to the normal height of a boat. A leg support member is attachable to the rail legs to support them at the ground level. A movable frame is positioned atop the base frame and has wheels indexable with channel members on the base frame and rail legs to be movable from a position alongside the vehicle on the rail legs to a position atop the vehicle on the base frame. A bed member is attached to the movable frame and provides a support for the boat. The bed further provides a support for a winch used in lifting the boat onto the bed member and for drawing the bed member atop the vehicle. A collapsible jim boom is associated with the base frame for cooperation with the winch cable in lifting the boat onto and off of the bed.

It is therefore an object of this invention to provide an improved vehicle top boat carrier.

It is a further object of this invention to provide a self-loading vehicle top boat carrier.

It is yet another and more specific object of this invention to provide a self-loading car top boat carrier having a bed for carrying the boat which is movable from a position atop the vehicle to a position alongside the vehicle for receiving the boat.

It is another and more specific object of this invention to provide a car top carrier for boats which includes a power operated winch and means associated with a stationary and movable frame for lifting a boat from the ground to the top of the car and for unloading therefrom by operation of the winch.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a side plan view of a vehicle equipped with the self-loading boat carrier of this invention with the boat mounted thereon in traveling position;

FIG. 2 is a top plan view similar to FIG. 1 with portions broken away to show underlying portions;

FIG. 3 is a diagrammatic view of the self-loading feature of the boat carrier of this invention;

FIG. 4 is a diagrammatic view similar to the view of FIG. 3, illustrating a further step;

FIG. 5 is a view similar to FIG. 4, illustrating another step;

FIG. 6 is a fragmentary sectional view illustrating an attachment member fastening the boat to the stationary frame;

FIG. 7 is a diagrammatic and plan view of the self-loading boat carrier of this invention, in association with the vehicle, illustrated by broken lines, in its boat-loading position;

FIG. 8 is a fragmentary sectional view illustrating the mounting of the movable frame and bed atop the stationary frame;

FIG. 9 is a top plan view illustrating the base frame;

FIG. 10 is a fragmentary side plan view of the point of attachment of the rail legs to the base frame;

FIG. 11 is a top plan view illustrating the same features as FIG. 10;

FIG. 12 is a top plan view of the self-loading boat carrier of this invention assembled atop a vehicle and illustrating underlying portions by broken lines;

FIG. 13 is a plan view partially in section of the leg support member of this invention.

DESCRIPTION OF THE PREFERRED EMBODIMENT

FIG. 1 illustrates the self-loading boat carrier 10 of this invention positioned atop an automobile 11 and carrying a boat 12. The boat carrier 10 is collapsed and folded for travel.

FIG. 2 is a top plan view of FIG. 1, with a portion 13 of the boat broken away to show the bed 14 of the carrier 10. As illustrated, there is room atop the bed 14 for the storage of boat related items such as a motor 15, gas can 16 and fishing tackle 17. Thus, the carrier 10 not only provides for the loading and carrying of a boat atop a vehicle but further provides for the sheltered transportation of articles, such as those illustrated, underneath the inverted boat on the top of the bed of the carrier. The bed may be equipped with tie-down straps or the like 18 for the purpose of securing the articles to be transported.

As best illustrated in FIG. 7, the carrier 10 consists of a plurality of attachment mounts which attach a base frame 21 to the roof 22 of a vehicle 11. The base frame 21 has associated therewith foldable rail legs 23 which can extend from a side of the main frame 21 outwardly and downwardly alongside of the vehicle 11 and terminate at a position 25 alongside of the vehicle and spaced from the ground a distance approximately equal to the normal height of a boat 12. A leg support member 27 connects with the ends 28 of the rail legs 23 to support them off of the ground. The bed 29 is mounted on a movable frame 30 and carries a winch 32 which may be of the power variety. A collapsible jim boom 35 is associated with the main frame and the bed. The jim boom is used in connection with the winch cable 36 for loading or unloading of the boat 12 from the bed.

FIG. 9 illustrates the base frame in position atop the vehicle. The base frame 21 is mounted on the vehicle 11 by means of four attachment mounts which have roof resting members 40 which may be curved to conform to the curvature of the vehicle roof and which may have nonabrasive pads 41 on the bottom sides thereof. The members 40 are attached to the roof gutters 43 of he vehicle by means of adjustable hooks 44. A vertical support bar 45 extends upwardly from the roof pad 40 and attaches to the frame.

The base frame consists of a plurality of longitudinally extending beams 47 which are attached, as by welding or the like, to transversely extending beams 48. The beams 47 and 48 may be comprised of metal tubular materials. Corner braces 49 are provided at the outside corners of the frame to brace the construction.

C-shaped channel members 50 are mounted atop the transverse members 48 with the opening of the channels facing towards each other. The channel members 50 extend beyond the tubular frame at one side 51 thereof a short distance. Foldable rail legs 23 are attached at the ends 51 of the channel members 50 as by double swing hinges 53. As illustrated in FIGS. 10 and 11, the hinges 53 are capable of allowing the rail legs 23 to pivot both vertically and horizontally from the channel members 50. The vertical pivot allows the rail legs 23 to project outwardly and downwardly from the channel members 50 while the horizontal pivot allows them to be swung towards one another so that they may be folded into parallel overlapping position adjacent the side tubular member 47b atop the roof of the vehicle 11. The rail legs 23 are constructed of the same C-shaped channel strips as the members 50 and are coupled to the members 50 by the hinges 53 so that the bottom wall of the channel of the rail legs is adjacent the bottom wall of the channel of the members 50.

As illustrated in FIG. 13, the free ends of the rail legs 23 terminate in a block-off portion 60 which closes the channel to prevent a wheel riding therein from passing through the otherwise open end of the channel. A pin 61 projects from the end 60 and is attached by a hinge connection 62 to a second pin 63.

The leg support member 27 consists of two vertical posts 64 and 65 interconnected by a horizontal bar 66 and strengthened by brace members 67. The posts 64 have hollow ends 68 into which the pins 63 may project to attach the rail legs 23 to the leg support member 27. As illustrated in FIG. 7, latchable braces 68 may be attached to the outside of the rail legs 23 and are latchably attachable to projections 69 on the vertical posts 64 and 65 of the leg support member 27 to maintain it at a proper angle with respect to the rail legs 23. With the rail legs 23 extending outwardly and downwardly from the roof of the vehicle 11, and with the leg support member 27 attached to the ends 60, the rail legs will be supported above the ground at their free ends a distance slightly less than the normal height of a boat.

The jim boom 35 is hingeably attached to the longitudinal member 47b to swing vertically therefrom. The jim boom 35 consists of two parallel beams 70 and 71 which have one of their ends hingeably attached to the longitudinal beam 47b at points equally spaced from the centerpoint of the member 47b. The hinge connections, as at 72 and 73, allow the beams 70 and 71 to be swung vertically from a position overlying the roof of the vehicle where the collapsed boom rests on the other longitudinal members 47 to a position alongside the vehicle as illustrated in FIG. 7. The other ends of the beams 70 and 71 are attached to a cross beam 75 which has hinged pins 76 projecting from either end thereof. The hinged pins 76 are attached to support beams 77 and 78 which in the folded travel position illustrated in FIG. 9 lie parallel to and spaced outwardly from the beams 70 and 71.

A crossbar 80 extends between the parallel beams 70 and 71 and is parallel to and spaced from the member 75. Two parallel extension beams 81 are hingeably attached to the crossbar 80 at their ends 82. At the opposite end 83 a shorter crossbar 84 is attached which has a cable guide or pulley 85 positioned in the center thereof. The hinged attachment of the ends 82 allows vertical movement of the extension beams 81 so that they may be hingeably swung outwardly beyond the beams 70 and 71 where they will rest against the member 75 as illustrated in FIG. 7. With the jim boom 35 extended outwardly from the main frame and with the extension beams 81 folded upwardly and outwardly therefrom, the support members 77 and 78 may be indexed with pins 86 mounted atop the bed 29 to provide an extended jim boom as illustrated in FIG. 7.

The bed 29 is mounted atop a movable frame 30 which in the preferred embodiment consists of three longitudinal members 91, 92 and 93 which are parallel to and spaced from one another. Two of the longitudinal members 92 and 93 are interconnected by transverse members 94 and 95 adjacent their ends. The longitudinal and transverse members may all be constructed of hollow tubing.

Two base plates 97 and 98 connect the longitudinal members 91, 92 and 93. The base plates 97 and 98, as illustrated in FIG. 8, consist of two plate members 100 and 101 each of which is connected at one end thereof to a double hinged member 102. The double hinge member 102 is fastened to the bed 29 as by means of screws 103. In this manner, each of the plates 100 and 101 may hingeably swing from the hinge member 102 independently of one another, and independently of the bed 29 with the exception that one of the ends of each of the members 100 and 101 is attached to the bed through the hinge 102.

Angle members 104 depend from the plates 100 and 101 with one angle member depending from the plate 100 at the free end thereof and two angle members depending from the plate 101, one of said members being positioned at the end of the plate 101. The angled members have their free ends 106 welded to the longitudinal members 91, 92 and 93 with the two longitudinal members 92 and 93 connected together by the transverse members 94 and 95 welded to the two angled members 104 which depend from the plate 101. The angled members 104 also serve as axle connections to wheels which support the movable frame and bed and which interfit with the channel members 50 and with the rail legs 23 to movably support the movable frame and bed atop the main frame and extended rail legs. Thus, the movable frame may be rolled on the wheels from the position atop the vehicle 11 as illustrated in FIG. 12 to a position atop the extended rail legs as illustrated in FIG. 7.

The hinged connection of the plates 100 and 101 to the bed provides a flexible joint allowing the movable frame to carry the rigid bed through the angle connection of the rail legs 23 to the members 50 of the main frame.

With the bed atop the vehicle as illustrated in FIGS. 1, 2 and 12, a boat positioned thereon will be easily transportable. In order to securely attach the boat to the roof of the vehicle, four fasteners 110 are mounted alongside the main frame. As illustrated in FIG. 6, the fasteners 110 have an angle portion 111 attached to the C-shaped rails 50 as by welding. A horizontal portion 112 projects outwardly therefrom and has a J-shaped clamp 113 fastened thereto along a hinge 114. A bolt 115 extends through the upper portion 116 of the J-shaped member and is receivable in an opening 117 in the horizontal portion 112. As illustrated in FIG. 6, the fastener 110 may be swung downwardly on the hinge as illustrated at 110b to allow the bed 29 with the boat 12 thereon to be positioned accurately atop the vehicle. Thereafter, the J-shaped portion 113 may be swung upwardly until the end thereof 120 contacts the gunnel 121 of the boat. With the bolt 115 inserted through the opening 117, the nut 122 can be tightened to firmly attach the boat in position with respect to the main frame.

With the boat thus firmly attached, the rail legs 23 can be folded into horizontal position alongside the frame atop the automobile. As illustrated in FIG. 12, the leg support member 27 is first inserted into the main frame atop the vehicle. The member 27 is receivable in the ends of the C-shaped rails 50. Fastening straps 125 can then be used to hold the rail legs and leg support member in position for traveling.

All that must be done to remove the boat from its position atop the vehicle is to undo the fasteners 110, extend the rail legs 23 and insert the pin 63 in the rail support member 27. Thereafter, the entire bed may be rolled from its position atop the vehicle on the movable frame 30 to a position adjacent the side of the vehicle as illustrated in FIG. 7. In this position, the boat may be swung off of the bed onto the ground or into the water. U-shaped blocks 126 are provided adjacent the outer edge 127 of the bed to receive the gunnels 121 of the boat and thereby serve as a pivot point for swinging the boat onto and off of the bed 29.

Because such boats can be quite heavy and awkward for one person to lift onto and off of the bed 29, our invention provides a self-loading feature whereby a winch 32 and winch cable 36 cooperate with elements of the frame to lift the boat 12 onto the bed 29, to draw the bed atop of the vehicle and in the unloading process, to draw the bed off of the top of the vehicle onto the rail legs and to thereafter lift the boat off of the bed into position alongside the vehicle on the ground or in the water.

The winch 32 is mounted atop the bed 29 adjacent one side thereof as illustrated in FIG. 12. The winch 32 is preferably electric-driven, and may be operated either from the vehicle's electric system, or from an independent battery mounted atop the bed. The winch 32 is mounted along one side of the bed so as to be operatable by an individual standing next to the vehicle who will be able to reach under the boat to activate and control the winch. The winch preferably is of the variable clutch variety and of a type which an adjustable drag may be hand-set as by a control knob 130. The control knob should be accessible to an individual even when a boat is in position atop the bed. This may be accomplished by an extendable cable or the like. The winch cable 36 cooperates with a pulley mount 131 atop the bed and passes through an opening 132 therein to a double pulley mount 133 fastened to the underside of the bed. A second double pulley mount 135 is attached to the longitudinal beam 47b midway between the hinge connections 72 and 73 of the parallel beams 70 and 71 of the jim boom 35. An anchor member 136 is attached to the longitudinal beam 47c on the opposite side of the main frame from the beam 47b, preferably directly across from the double pulley 135.

The operation of the winch cable is illustrated in FIGS. 3, 4 and 5 with FIG. 3 illustrating the position of the bed and cable for loading and unloading the boat from the bed. FIG. 4 illustrates a position of the bed and cable when it is desired to draw the bed upwardly along the rail legs to the main frame. FIG. 5 illustrates the position of the bed and cable when it is desired to move the bed from a position atop the vehicle to the loading and unloading position atop the rail legs.

As illustrated in FIG. 3, the boat can either be lifted off of the bed 29 to an upright position 140 adjacent the rail support member 27 where the boat may either rest on the ground or in the water, or lifted back onto the bed. This is done by passing the winch cable 36 over the pulley 131 and through the opening in the bed 132. The cable then passes between the two pulleys 133a and 133b, thence around the outermost pulley 135a of the double pulley 135. The cable is then extended upwardly along the jim boom and passed through the pulley or cable guide 85. It is thereafter hooked to the gunnel 141 on the side of the boat remote from the bracket 126. Energizing the winch 32 will then lift the boat to approximately centerpoint 143, where the weight of the boat has an approximately equal tendency to fall either back onto the bed 29 or over onto the ground. The ability of the boat to be lifted to this point by the winch is dependent upon the length and angular projection of the jim boom from the main frame. When the boat has reached the centerpoint 143, the clutch control 130 of the winch can be released slightly to allow the operator to push the boat over the centerpoint. Thereafter, the boat may be pivoted upon the brackets 126 in a controlled fall by adjusting the winch clutch until the boat has been placed upon the ground in the position 140. Thereafter, the winch cable 36 may be unhooked from the gunnel 141 and the boat pushed away from the brackets 126.

In order to load the boat on the bed 29, it need only be positioned adjacent the rail leg support 27 with the gunnel in position to rest in the brackets 126 as illustrated in FIG. 7. Thereafter, attaching the cable 36 to the gunnel 141 and energizing the winch will lift the boat to the center position 143. The winch clutch may then be loosened and the boat manually pushed overcenter towards the bed. Thereafter further control of the clutch will result in a controlled fall of the boat onto the bed 29.

FIG. 4 illustrates the method by which the winch is utilized to draw the movable frame and bed atop the vehicle. The winch cable 36 is again passed over the pulley 131 and through the opening 132 in the bed. The cable is then passed around the pulley 133b and over both of the pulleys 135a and 135b of the double pulley 135. The cable is then attached to the attachment member 136 on the main frame. Thereafter, energizing the winch 32 will draw the movable frame and boat up the rail legs and onto the main frame with the wheels 110 riding in the channel members 50.

The winch may also be utilized to lower the movable frame and bed onto the rail legs from its travel position atop the main frame. This is illustrated in FIG. 5 as being accomplished by passing the cable 36 over the pulley 131 and through the opening 132. Thereafter, the cable is drawn around the pulley 133a of the double pulley 133 and thence around the pulley 135b of the double pulley 135. The cable is then attached to the anchor member 136. It can therefore be seen that energizing the winch will draw in the cable to pull the bed 29 and movable frame to a position where the double pulley 133 is directly above the double pulley 135. By positioning the respective weight of the bed and movable frame with respect to the double pulley 133, this position may be an off-center position where the majority of the mass of the boat and bed now overlies the extended rail legs. Thereafter, by controlled use of the clutch 130, the cable may be played out slowly until the movable frame and bed are in the unloading position atop the rail legs as illustrated in FIG. 7. The jim boom may then be extended for unloading of the boat.

In order to prevent the movable frame and bed from moving up the extended rail legs when loading the boat 12, a spring stop 150 illustrated in FIG. 8 may be used. The stop is shown on the main frame member 50 but is also used on the legs 23. The stop consists of a band of spring metal 151 which has a pin 152 projecting from one end thereof. The pin 152 extends through an opening 153 in the C-shaped rail leg member. The pin 152 projects into the channel and will be effective to stop movement of the wheels 110 by abutment thereagainst. The other end 155 of the spring band 151 is fastened to the outside of the channel member. The abutment stops 150 are preferably placed on the side of the base frame and rail leg which the operator will be stationed on so as to work the clutch control 130.

It can therefore be seen from the above that our invention provides a self-loading boat carrier for transporting boats atop a vehicle and for loading and unloading therefrom in a semi-automatic manner and capable of control by one person.

Although the teachings of my invention have herein been discussed with reference to specific theories and embodiments, it is to be understood that these are by way of illustration only and that others may wish to utilize my invention in different designs or applications.

We claim as our invention:

1. A boat carrier for use in connection with vehicles which comprises: a base frame mountable atop a vehicle, rail members associated with said base frame extending from said base frame to a position adjacent the ground alongside of the vehicle, a movable platform associated with said base frame and said rails, said platform movable from a position atop said base frame on said vehicle to a position atop said rails alongside said vehicle, means for loading a boat from a position at the ends of said rails remote from the said vehicle onto the said movable platform, the said means for loading selectively effective to move the said movable platform from a loading position atop the said rails to a travel position atop the said base frame, said means for loading including a power driven winch 32, said winch mounted atop the said movable platform and movable therewith.

2. A device for transporting boats on the roof of a vehicle which comprises: a base frame, means for attaching said base frame to the roof of the vehicle, a plurality of rail leg members, means for attaching said rail leg members to said base frame adjacent a side thereof, said rail leg members dimensioned to extend from the said side of the said base frame to a position alongside the vehicle spaced from the ground at a distance approximately equal to the normal height of a boat to be carried, a movable bed associated with said base frame and said rail support legs, said bed adapted to ride on said base frame and said rail support legs from positions atop said base frame to and from a position atop said rail legs along side of said vehicle, a jim boom associated with said base frame, means, including cable means passing over said jim boom effective to lift a boat from an upright position on the ground adjacent the ends of said rail legs to an inverted position atop said boat on said rail legs, said means effective to move said bed from said position atop said rail legs to said position atop said base frame, the said means effective, with the said cable extending over the said jim boom, to unload an inverted boat from atop the bed when the said bed is in the position atop the rail legs and deposit the boat in an upright position adjacent the ends of the said rail legs.

3. The device of claim 2 wherein the said means is effective to move the said bed from the said position atop the said base frame to the said position atop the said rail legs.

4. The device of claim 3 wherein the said means includes a power operated winch and cable.

5. A self-loading device for transporting boats on the roof of a vehicle which comprises a main frame constructed of longitudinal and transverse beams mountable atop the roof of the vehicle by means of a plurality of detachable attachment mounts carrying the said base frame, two transverse C-shaped channel members attached to said base frame spaced from one another with the said channels opening towards each other, two rail legs pivotably attached to the ends of said channel members, said rail legs including C-shaped channel portions, said rail legs attached to said C-shaped channel members such that wheels riding in the C-shaped channel members can pass to the C-shaped channel portions of the said rail legs at the said point of attachment, said rail legs extendable from the said base frame atop the said vehicle to a position spaced from and alongside of the said vehicle spaced from the ground a distance approximately equal to the height of the boat to be carried, a leg support member for supporting the free ends of the said rail legs on the ground at the said position, a collapsible jim boom associated with the said base frame, the said jim boom pivotably attached to a longitudinal beam of said base frame and selectively positionable in a collapsed travel position atop portions of said base frame and in an operating position projecting outwardly from the said base frame away from the said vehicle to a position above the plane of the said rail legs, means for retaining the said jim boom in the said position above the said rail legs, a movable frame, said movable frame having wheels associated therewith indexable in said C-shaped channel members and said C-shaped channel portions, said movable frame movable from a position atop said base frame to a position alongside of said vehicle atop said rail legs, a boat carrying bed atop said movable frame, a power driven winch having a cable mounted atop said bed, and a plurality of cable guide sheaves associated with said bed, movable frame, base frame, and jim boom whereby the said power driven winch and cable is effective to lift a boat from an upright position adjacent the free ends of said rail legs to an inverted position atop said bed on said rail legs and to move said bed with said boat thereon from said position atop said rail legs to a travel position atop said base frame.

6. The device of claim 5 wherein the said power driven winch and cable is effective to move the said bed from the travel position atop the said base frame to a position alongside of the said vehicle atop the said rail legs and to unload a boat from atop the said bed on the rail legs to a position on the ground adjacent the said free ends of the said rail legs.

References Cited

UNITED STATES PATENTS

| | | | |
|---|---|---|---|
| 2,896,804 | 7/1959 | Ingram | 214—450 |
| 3,045,849 | 7/1962 | Tweten | 214—450 |

GERALD M. FORLENZA, Primary Examiner

J. MANNIX, Assistant Examiner